(12) United States Patent
Matsubara

(10) Patent No.: US 10,379,292 B2
(45) Date of Patent: Aug. 13, 2019

(54) OPTICAL TRANSMISSION MODULE

(71) Applicant: KYOCERA Corporation, Kyoto-shi, Kyoto (JP)

(72) Inventor: Takahiro Matsubara, Kizugawa (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/568,699

(22) PCT Filed: Apr. 21, 2016

(86) PCT No.: PCT/JP2016/062644
§ 371 (c)(1),
(2) Date: Oct. 23, 2017

(87) PCT Pub. No.: WO2016/175126
PCT Pub. Date: Nov. 3, 2016

(65) Prior Publication Data
US 2018/0156978 A1 Jun. 7, 2018

(30) Foreign Application Priority Data

Apr. 27, 2015 (JP) ................................. 2015-090054

(51) Int. Cl.
*G02B 6/30* (2006.01)
*G02B 6/10* (2006.01)
(Continued)

(52) U.S. Cl.
CPC ................. *G02B 6/30* (2013.01); *G02B 6/10* (2013.01); *G02B 6/381* (2013.01); *G02B 6/3861* (2013.01);
(Continued)

(58) Field of Classification Search
CPC .................................... G02B 6/30; G02B 6/10
(Continued)

(56) References Cited

U.S. PATENT DOCUMENTS

| 4,989,946 A | * | 2/1991 | Williams | ............. | G02B 6/3504 |
| | | | | | 385/16 |
| 4,991,922 A | * | 2/1991 | Dahlgren | ............. | B24B 19/226 |
| | | | | | 385/50 |

(Continued)

FOREIGN PATENT DOCUMENTS

| JP | 11-038270 A | 2/1999 |
| JP | 2000-275464 A | 10/2000 |

(Continued)

OTHER PUBLICATIONS

International Search Report, PCT/JP2016/062644, dated Jul. 26, 2016, 2 pgs.

*Primary Examiner* — Kaveh C Kianni
(74) *Attorney, Agent, or Firm* — Volpe and Koenig, P.C.

(57) ABSTRACT

An optical transmission module according to the disclosure comprises a first optical transmission line, a second optical transmission line, and a ferrule. The first optical transmission line has a first end face. The second optical transmission line has a second end face opposed to the first end face of the first optical transmission line. An end of the first optical transmission line is situated inside the ferule, and the ferule has a light-transmittable intermediary portion situated between the first end face and the second end face.

7 Claims, 6 Drawing Sheets

(51) Int. Cl.
 *G02B 6/38* (2006.01)
 *H04B 10/25* (2013.01)
(52) U.S. Cl.
 CPC ..... *H04B 10/2504* (2013.01); *H04B 2210/00* (2013.01)
(58) Field of Classification Search
 USPC ........................................................ 385/100
 See application file for complete search history.

(56) References Cited

U.S. PATENT DOCUMENTS

| | | | | |
|---|---|---|---|---|
| 5,212,746 A | * | 5/1993 | Miller | G02B 6/241 385/25 |
| 5,425,039 A | * | 6/1995 | Hsu | H01S 3/067 372/6 |
| 6,282,342 B1 | * | 8/2001 | Berkey | G02B 6/02052 385/15 |
| 9,897,770 B2 | * | 2/2018 | Park | G02B 6/4239 |
| 2003/0099453 A1 | * | 5/2003 | Moidu | G02B 6/4248 385/138 |
| 2003/0190135 A1 | * | 10/2003 | Moidu | G02B 6/4248 385/138 |
| 2003/0219218 A1 | * | 11/2003 | Kuhara | G02B 6/4292 385/89 |
| 2010/0007893 A1 | * | 1/2010 | Hall | G01H 9/004 356/480 |
| 2010/0008676 A1 | * | 1/2010 | Kojima | G02B 6/4201 398/141 |
| 2012/0330101 A1 | * | 12/2012 | Brennan | A61B 1/00096 600/177 |
| 2013/0236675 A1 | * | 9/2013 | Garner | B65H 19/1852 428/54 |
| 2017/0097481 A1 | * | 4/2017 | Park | G02B 6/4239 |

FOREIGN PATENT DOCUMENTS

| | | |
|---|---|---|
| JP | 2001-249245 A | 9/2001 |
| JP | 2005-345708 A | 12/2005 |
| JP | 2014-164270 A | 9/2014 |

* cited by examiner

OPTICAL TRANSMISSION MODULE

TECHNICAL FIELD

The present invention relates to an optical transmission module.

BACKGROUND ART

There is a heretofore known optical transmission module for connecting optical transmission lines. For example, in Japanese Unexamined Patent Publication JP-A 2000-275464, there is disclosed an optical transmission module in which first and second optical cables which serve as optical transmission lines and are fixed to a housing are connected to each other so as to butt ends thereof.

SUMMARY OF INVENTION

An optical transmission module according to the disclosure comprises a first optical transmission line, a second optical transmission line, and a ferrule. The first optical transmission line has a first end face. The second optical transmission line has a second end face opposed to the first end face of the first optical transmission line. An end of the first optical transmission line is situated inside the ferule, and the ferule has a light-transmittable intermediary portion situated between the first end face and the second end face.

DESCRIPTION OF EMBODIMENTS

Hereinafter, an optical transmission module according to the present disclosure will be described with reference to FIGS. 1 to 6. While the optical transmission module can be placed with either side up or down in use, in this description, for purposes of convenience, on the basis of the definition of a rectangular coordinate system (X, Y, Z) in which a positive direction along the Z axis corresponds to an upward direction, the terms such as "upper surface" and "lower surface" are used.

It is noted that the invention is not limited to this embodiment, and that various changes, modifications, and improvements are possible without departing from the scope of the invention.

An optical transmission module 1 is configured to transmit light between a plurality of optical transmission lines. The optical transmission module 1 is mounted in a product such for example as an optical transceiver, a server, or a router.

Figure 1:
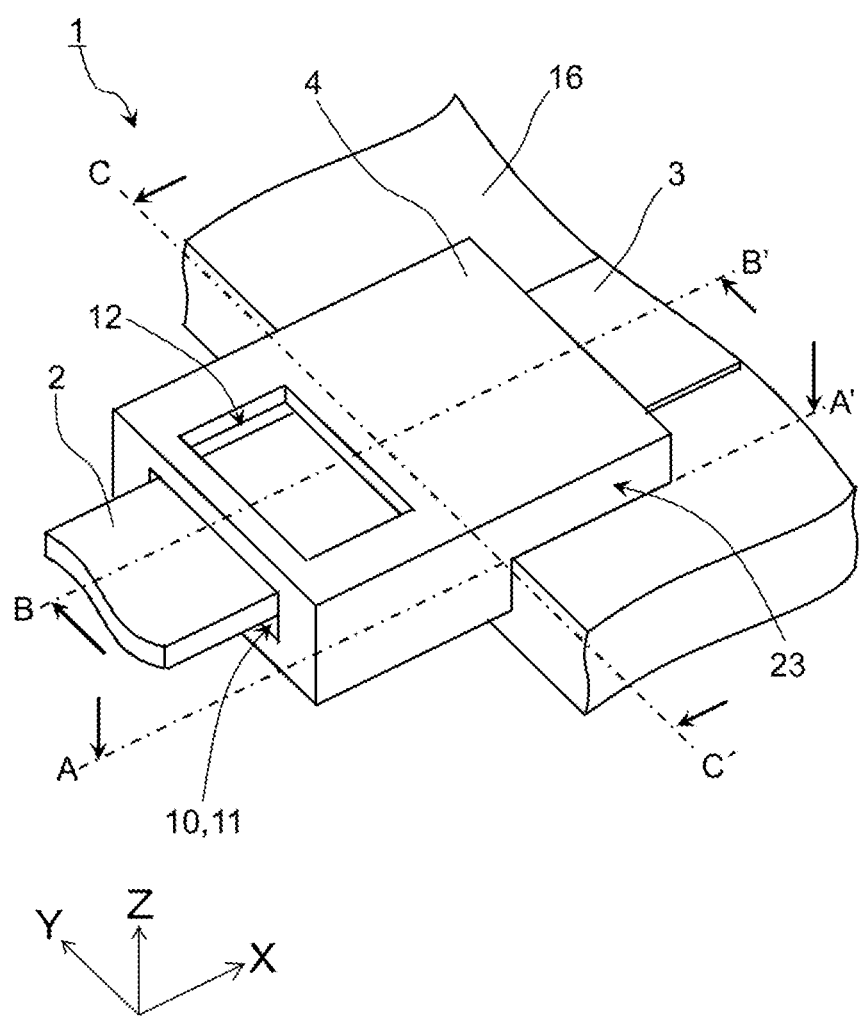
FIG. 1 is a perspective view schematically showing an optical transmission module in accordance with one embodiment of the invention.
Figure 2:
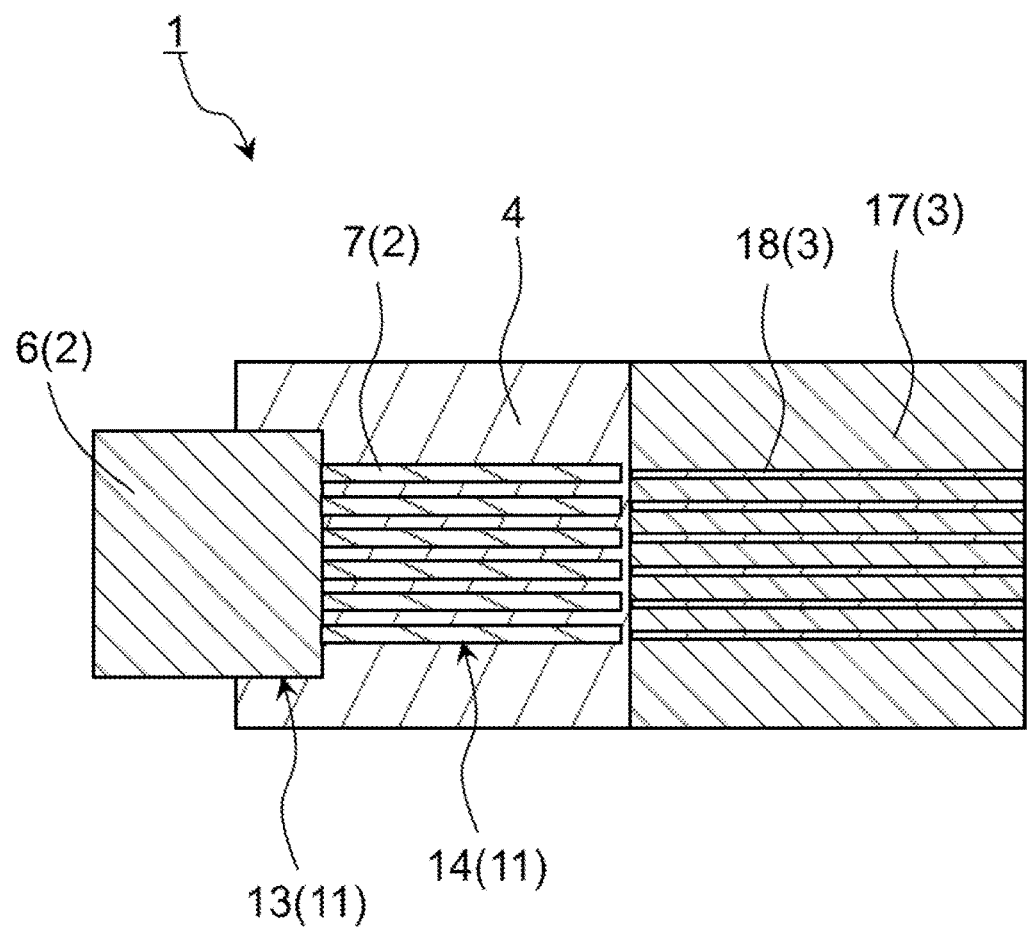
FIG. 2 is a sectional view schematically showing an optical transmission module in accordance with one embodiment of the invention.
Figure 3:
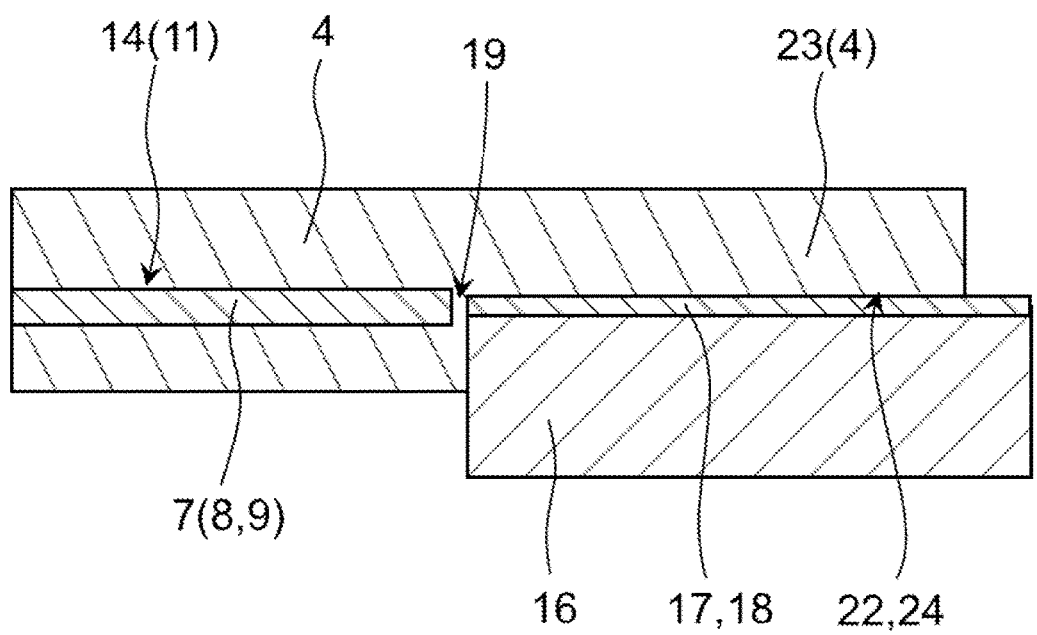
FIG. 3 is a sectional view schematically showing the optical transmission module in accordance with one embodiment of the invention as viewed from a different perspective than in the case shown in FIG. 2.

In the present disclosure, as shown in FIGS. 1 to 3, the optical transmission module 1 comprises two optical transmission lines, namely a first optical transmission line 2 and a second optical transmission line 3, and optically connect the first optical transmission line 2 and the second optical transmission line 3. Consequently, the optical transmission module 1 can transmit optical signals between the first optical transmission line 2 and the second optical transmission line 3.

More specifically, the optical transmission module 1 of the present disclosure has a ferrule 4 into which an end of the first optical transmission line 2 is inserted, and, the first optical transmission line 2 and the second optical transmission line 3 are optically connected to each other via the ferrule 4. In the optical transmission module 1, the first optical transmission line 2 and the second optical transmission line 3 are secured to each other by adhesively bonding the ferrule 4 to the second optical transmission line 3.

FIG. 1 is a perspective view of the optical transmission module 1 in accordance with this embodiment, representing the schematic drawing of a junction between the first optical transmission line 2 and the second optical transmission line 3 of the optical transmission module 1. Moreover, FIG. 2 is a sectional top view of the optical transmission module 1 shown in FIG. 1 taken along the dash-and-dot line A-A' with respect to a positive direction along the Y axis, representing the schematic drawing of the internal structure of the optical transmission module 1. Furthermore, FIG. 3 is a sectional view of the optical transmission module 1 shown in FIG. 1 taken along the dash-and-dot line B-B' with respect to a negative direction along the Z axis, representing the schematic drawing of the internal structure of the optical transmission module 1 as seen from a different perspective than in the case shown in FIG. 2.

Figure 4:
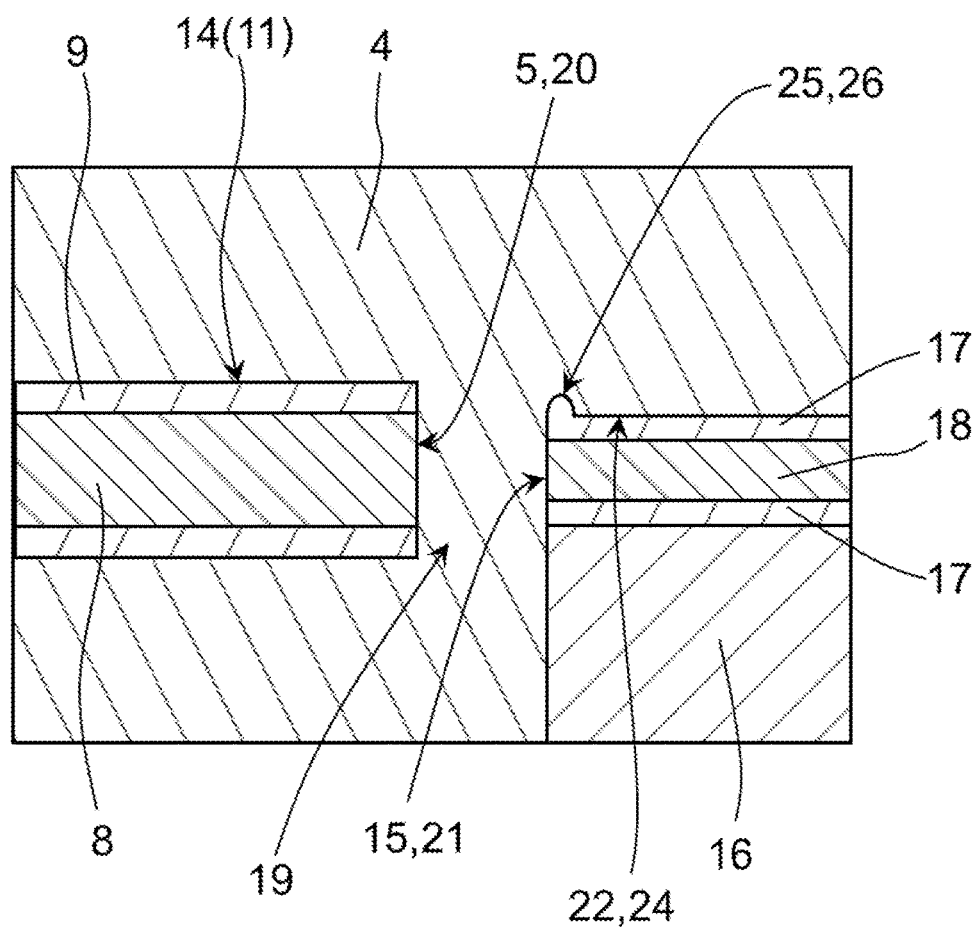
FIG. 4 is an enlarged view showing part of the section shown in FIG. 3 in enlarged dimension.

The first optical transmission line 2 can transmit optical signals. As shown in FIG. 4, the first optical transmission line 2 has a first end face 5. The first end face 5 is a face which is situated at one end of the first optical transmission line 2 and is perpendicular to a light transmission direction of the first optical transmission line 2. That is, the first end face 5 serves as an exit face to permit the exit of light toward the second optical transmission line 3, or a light-receiving face to receive light from the second optical transmission line 3.

FIG. 4 is a drawing showing the section of the optical transmission module 1 shown in FIG. 3 in enlarged dimension.

The first optical transmission line 2 of the present disclosure is an optical cable 6. The optical cable 6 has a plurality of optical fibers 7. As shown in FIG. 4, each optical fiber 7 comprises a first core portion 8 to allow passage of light therethrough, and a first clad portion 9 which covers the first core portion 8. The first core portion 8 is slightly greater in refractive index than the first clad portion 9. With such a structure, light is reflected on the interface between the first core portion 8 and the first clad portion 9, whereby transmission of optical signals can be achieved. Moreover, when the first core portion 8 is a core of gradient refractive index type in which the refractive index decreases quadratically toward the first clad portion 9, being also called "graded-index core", an optical signal travels meanderingly through the interior of the core. Note that the first core portion 8 and the first clad portion 9 are exposed at the first end face 5, and, an optical signal passes through the first core portion 8 at the first end face 5. For example, the first core portion 8 at the first end face 5 is formed in a circular shape.

The first optical transmission line 2 is formed of a glass material or a plastic material and is prepared by a heretofore known method.

The individual optical fibers 7 may either be bundled while being covered with a sheath or be left unbundled outside the ferrule 4. The form of the optical cable 6 is not limited to a cable, but may be, for example, a film comprising a core and a clad. For example, the plurality of optical fibers 7 are aligned in a row in a width direction of the ferrule 4.

The ferrule 4 retains the end of the first optical transmission line 2 inserted therein, so that the first optical transmission line 2 can be fixedly positioned. For example, as shown in FIG. 1, the ferrule 4 according to this embodiment is shaped in a rectangular parallelepiped with part thereof cut away, expressed differently, a rectangular parallelepiped with part thereof protruding toward the second transmission line 2. However, the shape of the ferrule 4 is not limited to the above shape.

The ferrule 4 may be formed of a transparent plastic material such as epoxy resin, polyimide resin, phenol resin, or acrylic resin by a heretofore known method.

A side surface of ferrule 4 is provided with a first opening 10 into which the end of the first optical transmission line 2 is inserted. Moreover, the ferrule 4 has a recess 11 extending from the first opening 10 in a light transmission direction thereof. In other words, the recess 11 extends from the first opening 10 while being recessed in the light transmission direction. This allows the end of the first optical transmission line 2 to be inserted into the recess 11 through the first opening 10, and thereby allows the end of the first optical transmission line 2 to be secured to the inner surface of the recess 11 via an adhesive. As shown in FIG. 1, an upper surface of the ferrule 4 is provided with a second opening 12 for injecting the adhesive.

As shown in FIGS. 2 to 5, the recess 11 of the present disclosure comprises a first recess 13 for receiving the cable portion comprising a bundle of the plurality of optical fibers 7, and a plurality of second recesses 14, each of which is sunken relative to the bottom of the first recess 13, for receiving their respective optical fibers 7 individually.

Figure 5:
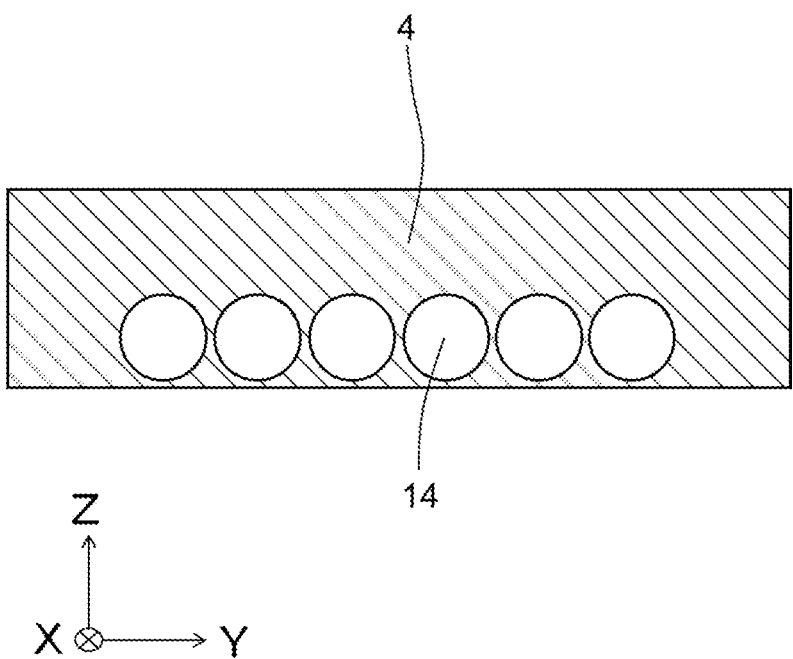
FIG. 5 is a sectional view schematically showing the optical transmission module in accordance with one embodiment of the invention as viewed from a different perspective than in the case shown in FIGS. 2 and 3.

FIG. 5 is a sectional view of the optical transmission module 1 shown in FIG. 1 taken along the dash-and-dot line C-C' with respect to the negative direction along the Z axis, illustrating the ferrule 4 of the optical transmission module 1 alone.

Like the first optical transmission line 2, the second optical transmission line 3 can transmit optical signals. As shown in FIGS. 2 to 4, the second optical transmission line 3 has a second end face 15. The second end face 15 is a face which is situated at one end of the second optical transmission line 3 and is perpendicular to a light transmission direction of the second optical transmission line 3. The second end face 15 serves as an exit face to permit the exit of light toward the first optical transmission line 2, or a light-receiving face to receive light from the first optical transmission line 2. The second end face 15 is opposed to the first end face 5 to allow light to be transmitted between the first optical transmission line 2 and the second optical transmission line 3.

The optical transmission module 1 further comprises a substrate 16 for supporting the second optical transmission line 3. The second optical transmission line 3 is in layer form and is laminated on the upper surface of the substrate 16. The second optical transmission line 3 is a so-called optical waveguide. More specifically, as shown in FIG. 4, the second optical transmission line 3 comprises a second clad layer 17 and a plurality of second core portions 18 arranged within the second clad layer 17. The second core portion 18 is greater in refractive index than the second clad layer 17. The second core portion 18 is similar in function to the first core portion 8 of the first optical transmission line 2, and the second clad layer is similar in function to the first clad portion 9 of the first optical transmission line 2. With this configuration, an optical signal is transmitted while being confined within the second core portion 18.

Moreover, the second core portion 18 and the second clad layer 17 are exposed at the second end face 15, and, an optical signal passes through the second core portion 18. For example, the second core portion 18 at the second end face 15 is formed in a rectangular or circular shape. Furthermore, in the present disclosure, the second end face 15 of the second optical transmission line 3 is arranged flush with the side surface of the substrate 16.

The second optical transmission line 3 is prepared by a heretofore known method.

The second optical transmission line 3 is formed of epoxy resin, polyimide resin, phenol resin, or acrylic resin, for example. It is advisable that the refractive index of the second core portion 18 is greater than or equal to 1.5 but less than or equal to 1.6, for example. Moreover, it is advisable that the refractive index of the second clad layer 17 is greater than or equal to 1.45 but less than or equal to 1.55, for example.

The recess 11 of the ferrule 4 has a bottom. Since the recess 11 is recessed in the light transmission direction, it follows that the bottom of the recess 11 is opposed to the first end face 5 of the first optical transmission line 2. The bottom of the recess 11 is formed of a light-transmittable material. That is, the bottom of the recess 11 becomes an intermediary portion 19 situated between the first end face 5 and the second end face 15, and, light is transmitted between the first optical transmission line 2 and the second optical transmission line 3 via the intermediary portion 19 of the ferrule 4. It is advisable that the thickness of the intermediary portion 19 is less than or equal to 0.1 mm, for example. Moreover, it is advisable that the transmittance of the intermediary portion 19 is 85%/mm or above.

The intermediary portion 19 has a first confronting face 20 facing the first end face 5, and a second confronting face 21 facing the second end face 15. The intermediary portion 19 may be formed of an optically transparent resin material such for example as polyetherimide resin, acrylic resin, or polycarbonate resin.

In the case where the end faces of, respectively, optical transmission lines are optically connected, due to the end face of the optical transmission line being exposed, for example, heretofore it has been necessary to, after securing the optical transmission line to a ferrule, grind the ferrule and the optical transmission line, and the grinding of the ferrule and the optical transmission line has been much time-consuming operation. This has constituted an impediment to handling of a lot of terminating work for optical transmission lines in the production process at lower cost.

In this regard, according to the invention, the ferrule 4 has the intermediary portion 19, and, the first optical transmission line 2 and the second optical transmission line 3 are optically connected to each other via the intermediary portion 19. That is, in optically connecting the first optical transmission line 2 and the second optical transmission line 3, there is no need to expose the end face of the first optical transmission line 2, and it is thus possible to save the time and effort to grind the exposed end face of the first optical transmission line 2, and thereby increase the efficiency of production of the optical transmission module 1. In addition, since the end face of the first optical transmission line 2 is not exposed, it is possible to reduce occurrence of accidents such as damage to the end face caused by contact with other object, for example.

While, in the ferrule 4, it will be sufficient if part of the intermediary portion 19 is formed of a light-transmittable material, the ferrule 4 may be formed of a single material in its entirety. Consequently, for example, when the ferrule is molded by a molding die, a sturdy ferrule member in single-piece form can be formed with ease.

The first confronting face 20 of the intermediary portion 19 may be made alongside the first end face 5. This facilitates leaving a uniform distance between the first end face 5 and the first confronting face 20. Hence, the optical axis of the first optical transmission line 2 can be readily brought into alignment with the optical axis of the second optical transmission line 3, and it is possible to reduce light losses between the first optical transmission line 2 and the second optical transmission line 3.

The first end face 5 of the first optical transmission line 2 may be kept in contact with the first confronting face 20 of the intermediary portion 19. This facilitates alignment between the optical axis of the first end face 5 and the optical axis of the first confronting face 20, and also can reduce the space between the first end face 5 and the first confronting face 20. Hence, it is possible to reduce optical axis misalignment between the first end face 5 and the first confronting face 20, as well as light losses ascribable to the space between the first end face 5 and the first confronting face 20.

The refractive index of the intermediary portion 19 may be set to be equal to or analogous to the refractive index of the first core portion 8 exposed at the first end face 5. This makes it possible to reduce unnecessary reflection of outgoing light from the first end face 5 by the first confronting face 20 of the intermediary portion 19, and thereby reduce losses of optical signals. It is advisable that the refractive index of the first core portion 8 is greater than or equal to 1.45 but less than or equal to 1.5, for example. Moreover, it is advisable that the refractive index of the intermediary portion is greater than or equal to 1.5 but less than or equal to 1.55, for example. The term "analogous" as used herein means that the difference in refractive index between the intermediary portion 19 and the first core portion 8 is less than or equal to 5%. Moreover, the refractive index of the intermediary portion 19 may be set to be equal to or analogous to the refractive index of the second core portion 18 left exposed at the second end face 15.

Meanwhile, the refractive index of the intermediary portion 19 may be set to be greater than the refractive index of the first core portion 8 exposed at the first end face 5. This makes it possible to reduce light losses caused by the divergence of outgoing light from the first end face 5. In this case, it is advisable that the refractive index of the intermediary portion 19 is greater than or equal to 1.56 but less than or equal to 1.75, for example. Moreover, the refractive index of the intermediary portion 19 may be set to be greater than the refractive index of the second core portion 18 left exposed at the second end face 15.

The second confronting face 21 of the intermediary portion 19 may be made alongside the second end face 15. This facilitates leaving a uniform distance between the second end face 15 and the second confronting face 21, and it is possible to reduce light losses between the first optical transmission line 2 and the second optical transmission line 3.

The second end face 15 of the second optical transmission line 3 may be kept in contact with the second confronting face of the intermediary portion 19. This makes it possible to reduce optical axis misalignment between the second end face 15 and the second confronting face 21, as well as to reduce light losses ascribable to the space between the second end face 15 and the second confronting face 21.

The first confronting face 20 and the second confronting face 21 of the intermediary portion 19 may be formed as curved surfaces. This allows the intermediary portion 19 to serve also as a lens. Thus, outgoing light from the first end face 5 of the first optical transmission line 2 or outgoing light from the second end face 15 of the second optical transmission line 3 can be converged by the intermediary portion 19, and it is possible to reduce losses caused by an increase of the beam diameter of the outgoing light.

The second confronting face 21 of the intermediary portion 19 may be kept in contact with, in addition to the second end face 15 of the second optical transmission line 3, the side surface of the substrate 16. This makes it possible to provide a wider area of contact for the second confronting face 21, and place the second confronting face 21 on the second end face 15 with stability.

The ferrule 4 may further include a protrusion 23 which protrudes along the second optical transmission line 3 and includes a lower surface 22 which is, at least partly, kept in contact at least with the upper surface of the second optical transmission line 3. This makes it possible to carry out vertical alignment between the second end face 15 and the second confronting face 21 by the upper surface of the second optical transmission line 3 and the lower surface 22 of the protrusion of the ferrule 4. Accordingly, it is possible to reduce misalignment between the first optical transmission line 2 and the second optical transmission line 3.

Moreover, since alignment with respect to the second optical transmission line 3 is carried out by the ferrule 4 which secures the first optical transmission line 2, heretofore conventional placement of a receptacle or ferrule on the second-optical-transmission-line 3 side can be omitted, and the number of constituent components can be reduced. Furthermore, since the first optical transmission line 2 and the second optical transmission line 3 are brought into alignment with each other by a single member, the alignment can be achieved with reference to a single member, and this can facilitate the alignment between the first optical transmission line 2 and the second optical transmission line 3.

Figure 6:
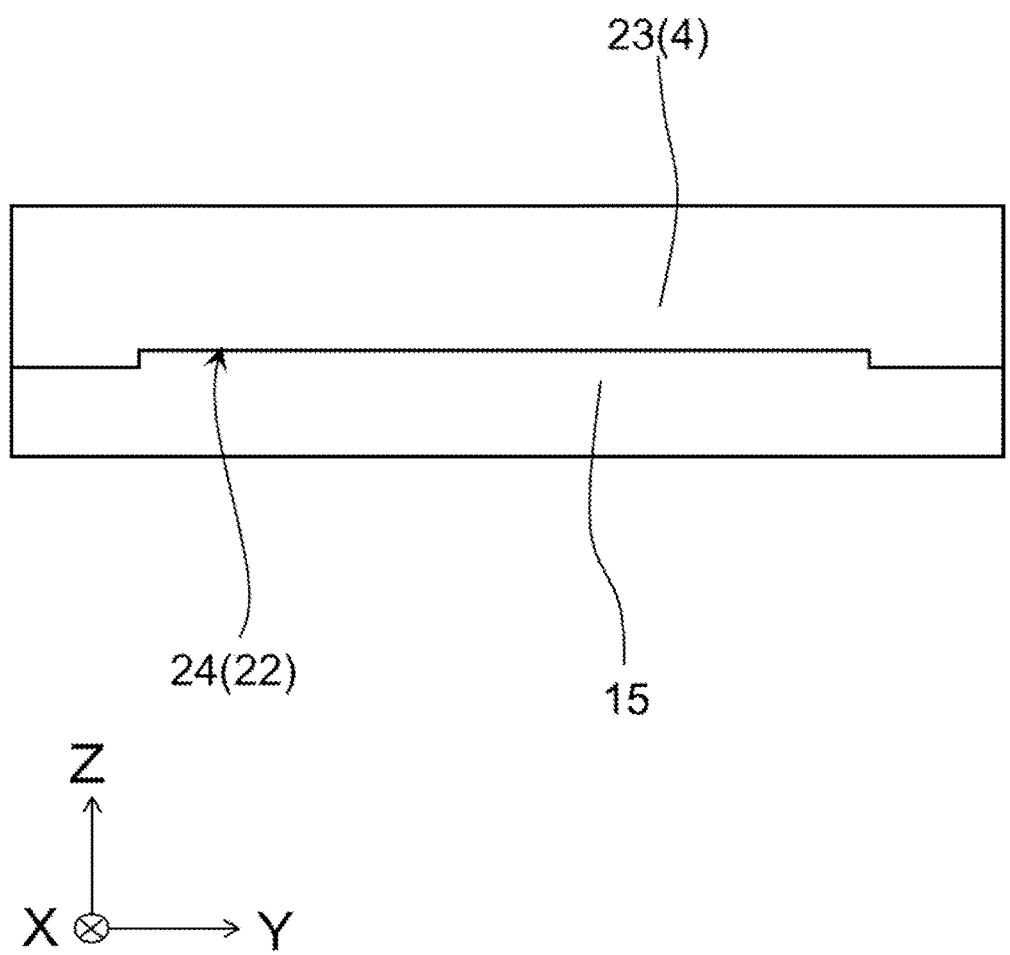
FIG. 6 is a side view schematically showing the optical transmission module in accordance with one embodiment of the invention.

The lower surface 22 of the ferrule 4 may include a third confronting face 24 which faces the upper surface of the second optical transmission line 3 and extends along the upper surface of the second optical transmission line 3. As shown in FIG. 6, the third confronting face 24 may be located above the level of the rest of the lower surface 22. In other words, the lower surface 22 may be recessed to define the third confronting face 24. This makes it possible to fit the second optical transmission line 3 in the lower surface 22 of the ferrule 4, and reduce planar (XY planewise) displacement of the second optical transmission line 3 in a direction perpendicular to the light transmission direction.

It is advisable that the thickness of the second optical transmission line 3 is greater than or equal to 60 μm but less than or equal to 100 μm, for example. Moreover, it is advisable that the recessed amount to define the third confronting face 24 is greater than or equal to 60 µm but less than or equal to 100 µm, for example.

FIG. 6 is a side view of the ferrule 4 of the optical transmission module 1 shown in FIG. 1 as seen from the second confronting face 21 of the ferrule 4.

It is advisable that the lower surface 22 of the ferrule 4 is configured so that only the third confronting face 24 makes contact with the second optical transmission line 3. That is, the recessed amount of the third confronting face 24 is set to be smaller than the thickness of the second optical transmission line 3. Since the third confronting face 24 and the upper surface of the second optical transmission line 3 determines the vertical position, it is possible to reduce misalignment between the first optical transmission line 2 and the second optical transmission line 3 in the vertical direction.

The lower surface 22 of the ferrule 4 may be located below the level of the upper end of the first optical transmission line 2. Consequently, for example, even if the first optical transmission line 2 is greater in thickness than the second optical transmission line 3, it is possible to achieve vertical alignment between the first optical transmission line 2 and the second optical transmission line 3 so that their optical axes are brought into coincidence with each other. In this embodiment, it is advisable that the thickness of the first optical transmission line 2 at the first end face 5 is greater than or equal to 100 µm but less than or equal to 200 µm, for example.

As shown in FIG. 4, the second optical transmission line 3 may further include a projection 25 extending upwardly. The protrusion 23 of the ferrule 4 may be provided with a concavity corresponding to the projection 25 of the second optical transmission line 3. Consequently, it is possible to reduce displacement of the second optical transmission line 3 in the direction of light transmission by hooking the projection 25 of the second optical transmission line 3 in the concavity 26 of the ferrule 4.

The projection 25 of the second optical transmission line and the concavity 26 of the ferrule 4 may extend in the direction of arrangement of the plurality of second core portions 18 of the second optical transmission line 3. This makes it possible to achieve alignment between the first optical transmission line 2 and the second optical transmission line 3 with greater stability.

REFERENCE SIGNS LIST

1: Optical transmission module
2: First optical transmission line
3: Second optical transmission line
4: Ferrule
5: First end face
6: Optical cable
7: Optical fiber
8: First core portion
9: First clad portion
10: First opening
11: Recess
12: Second opening
13: First recess
14: Second recess
15: Second end face
16: Substrate
17: Second clad layer
18: Second core portion 19: Intermediary portion
20: First confronting face
21: Second confronting face
22: Lower surface
23: Protrusion
24: Third confronting face
25: Projection
26: Concavity

The invention claimed is:

1. An optical transmission module, comprising:
a first optical transmission line having a first end face;
a second optical transmission line having a second end face opposed to the first end face of the first optical transmission line; and
a ferrule having a recess which opens at a side surface thereof and is recessed in a light transmission direction, wherein an end of the first optical transmission line is situated inside the recess, the ferrule is entirely formed of a single light-transmittable material, and the recess includes a light-transmittable bottom portion that optically connects the first optical transmission line with the second optical transmission line,
wherein the light-transmittable intermediary bottom portion of the recess includes:
a first confronting face that faces the first end face and extends along the first end face, and
a second confronting face that faces the second end face, extends along the second end face, and makes contact with the second end face.

2. The optical transmission module according to claim 1, wherein the first end face makes contact with the first confronting face.

3. The optical transmission module according to claim 1, further comprising:
a substrate which supports the second optical transmission line,
wherein the second optical transmission line is in a layer form and is laminated on an upper surface of the substrate, and
the second confronting face is opposed to the side surface of the substrate, and makes contact with the side surface of the substrate and the second end face.

4. The optical transmission module according to claim 1, wherein the ferrule further comprises a protrusion which protrudes along the second optical transmission line and includes a lower surface which is, at least partly, kept in contact with an upper surface of the second optical transmission line.

5. The optical transmission module according to claim 4, wherein the lower surface of the ferrule further comprises a third confronting face opposed to the upper surface of the second optical transmission line, and
the third confronting face is sunken relative to a rest of the lower surface.

6. The optical transmission module according to claim 4, wherein the lower surface of the protrusion is located below a level of an upper end of the first optical transmission line.

7. The optical transmission module according to claim 4, wherein the second optical transmission line further comprises a projection extending upwardly, and
the protrusion of the ferrule further comprises a concavity corresponding to the projection.

* * * * *